Dec. 4, 1923.

W. A. DE WOLFE 1,476,154

PRESSURE GAUGE

Filed Aug. 17, 1921

Inventor

W. A. de Wolfe.

By Lacey & Lacey, Attorneys

Patented Dec. 4, 1923.

1,476,154

UNITED STATES PATENT OFFICE.

WILBURN A. DE WOLFE, OF CONSORT, ALBERTA, CANADA.

PRESSURE GAUGE.

Application filed August 17, 1921. Serial No. 492,918.

*To all whom it may concern:*

Be it known that I, WILBURN A. DE WOLFE, a citizen of the Dominion of Canada, residing at Consort, in the county of Red Deer and Province of Alberta, have invented certain new and useful Improvements in Pressure Gauges, of which the following is a specification.

This invention relates to air pressure gauges commonly used to read the pressure when inflating automobile tires.

The main object is to provide a means for setting the gauge at a certain pressure so that when the tire is inflated to that pressure the compressed air will be led through a by-pass and at the same time give a signal that the desired pressure has been reached.

A further object is to provide a gauge which can be set at a certain pressure and the tire filled to that pressure without the necessity of attaching a separate pressure gauge to find the air pressure in the tire.

With these and other objects in view, the invention consists in the construction, combination and arrangement of parts as will be hereinafter fully described, illustrated in the accompanying drawings, and pointed out in the claims hereunto appended.

Referring to the drawings, like numerals designate like parts in the various drawings.

Figure 1:
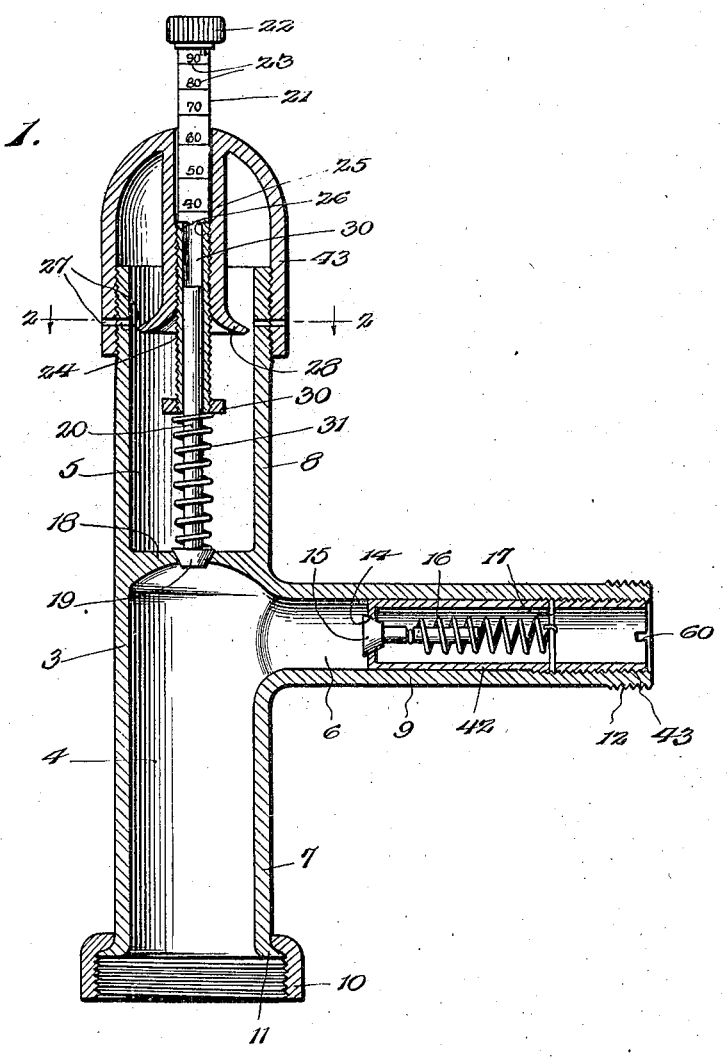
Figure 1 is a sectional view of my invention.
Figure 2:
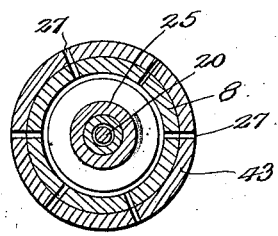
Figure 2 is a sectional view of the pressure gauge taken along line 2—2 of Figure 1.

3 indicates the body member which is preferably T-shaped having a hollow centre which forms three different air chambers 4, 5, and 6 in the respective shanks 7, 8, and 9. The shank 7 is provided with an interiorly threaded screw cap 10 for connecting onto the end of the tire valve. This cap is placed over the shank 7 and the end of the shank 7 is then flanged outwardly as at 11.

The shank 9 is provided with an exteriorly threaded portion as at 12 over which fits a tubing (not shown) from a pressure tank or pump which tubing has suitable controlling means for allowing the air to pass through the same. The interior of the shank 9 is threaded as at 45 to receive a sleeve 42, which sleeve is screwed into this portion by an ordinary screw driver fitting into oppositely positioned slots 60 in the outer end of sleeve 42. The inner end of the sleeve forms a seat 14 for the valve 15 which is tensionally held against the seat 14 of the sleeve 42 by a spring 16, which spring has its opposite end attached to a cross pin 17. The cross pin 17 is fitted transversely in the sleeve 42 and when the valve and its tensioning means are properly fitted into the sleeve 42, the sleeve is then inserted and screwed into the end of shank 9. By having this valve 15 so positioned, the air is forced from the tubing into the air chamber 6 and into the air chamber 4. The valve 15 is so positioned that it will not allow the air to pass from the air chamber 4 back into the air chamber 6.

Referring to the shank 8, I provide a flange 18 which forms a valve seat for the valve 19, the valve stem 20 extending upwardly into the adjustable gauging means 21 which is provided with a longitudinal opening 30 on its lower end and a suitably knurled head 22 on its upper end. This gauging means is provided with suitably inscribed indication marks 23 near its upper end and near its lower end it is provided with an exteriorly threaded portion 24. The end of shank 8 is provided with a cap 43 which is threadedly engaged thereon. Said cap is provided with an inwardly extending neck portion 25 having interior threads 26 adapted to receive the exteriorly threaded portion 24 of the gauging means 21. The shank 8 and the cap 43 are provided with suitable registering slots 27 which in conjunction with the flared end 28 of the neck 25 causes a whistle when the air fills the air chamber 5. The lower end of the gauging means 21 is provided with a threaded collar 44 and a spring 31 is suitably positioned between the collar 44 and the valve 19. The graduation marks 23 are made to correspond with the strength of the spring 31 so that the spring resistance at each instance will be overcome when the pressure in pounds per square inch, as indicated on the scale, has been reached on the lower face of the valve 19. By turning the gauging means 21 upwardly in the neck 25 the tension of the spring 21 will become less and will thus indicate on the gauge a lower pressure. Likewise it will take less pressure when the chamber 4 is filled to drive the valve 19 upwardly so as to allow the air to pass through the chamber 5 and escape into the slots 27.

From the foregoing it is thought that the construction of my invention will be clearly understood, and, therefore, a more extended explanation has been omitted.

What I claim as new is:

1. In a safety valve having a body provided with a chamber in connection with a pressure source, a removable cap fitting over one end of said body and adapted to close the chamber outwardly, said cap having apertures leading to the atmosphere from said chamber, an axial sleeve integral with said cap, an indicator member having threaded engagement with said sleeve, a valve normally closing communication between said chamber and the pressure source, said valve having a stem in sliding engagement with said member and a spring between said member and said valve tending to close the latter.

2. In a safety valve having a body provide with a chamber in connection with a pressure source, a removable cap fitting over one end of said body and adapted to close the chamber outwardly, said cap having apertures leading to the atmosphere from said chamber, an axial sleeve integral with said cap, an indicator member having threaded engagement with said sleeve, a valve normally closing communication between said chamber and the pressure source, said valve having a stem in sliding engagement with said member and a spring between said member and said valve tending to close the latter, a transverse partition in said body integral therewith and provided with a seat for said valve.

In testimony whereof I affix my signature.

WILBURN A. DE WOLFE. [L. S.]